Aug. 20, 1968     I. MINI     3,397,787

HORIZONTAL TABLE TYPE FILTER ELEMENTS WITH TIMING MEANS

Filed May 16, 1967     7 Sheets-Sheet 2

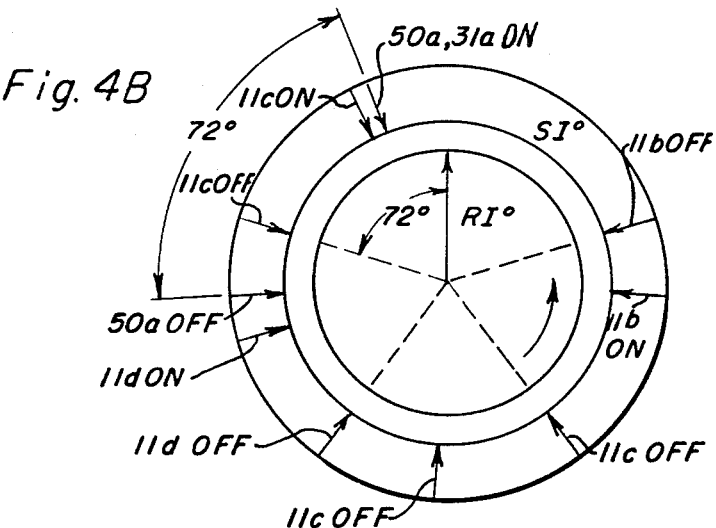
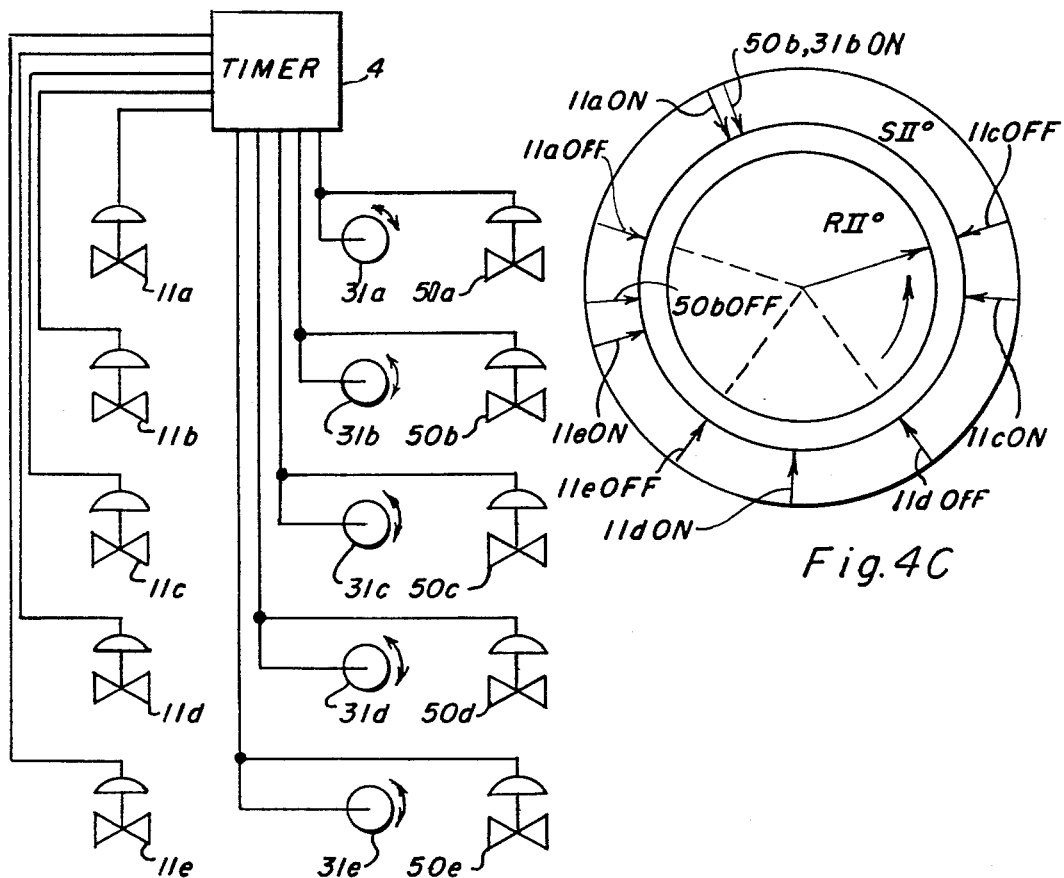

3,397,787
HORIZONTAL TABLE TYPE FILTER ELEMENTS
WITH TIMING MEANS
Iti Mini, Milan, Italy, assignor to Montecatini Edison
S.p.A., Milan, Italy, a corporation of Italy
Continuation-in-part of application Ser. No. 466,211,
June 23, 1965. This application May 16, 1967, Ser.
No. 642,643
Claims priority, application Italy, June 30, 1964,
14,261/64
11 Claims. (Cl. 210—139)

ABSTRACT OF THE DISCLOSURE

A filter assembly having multiple, horizontal, vacuum operated, table type filter elements and having a feeder distributor stage which supplies slurry and $n$ different washings to $n+1$ filter elements while another filter element remains unfed and is overturned to discharge residue, and having a collector stage which collects each filtrate separately in $n+1$ vessels, and timing means to operate the filter assembly continuously, each filter element receiving the different fluids and being overturned in sequence one step ahead of or behind of another element.

Specification

This is a continuation-in-part of my application Ser. No. 466,211, filed June 23, 1965, now abandoned.

My invention relates to filters of the continuous vacuum type. More particularly, it relates to such improved filters suitable for use in multiple backwashings, especially in situations where it is desired to separate a liquid from a quite fine solid and where it is necessary to effect a thorough washing with only a relatively moderate amount of additional liquid.

At present there are many types of filters which are utilized for vacuum filtration and subsequent washings. Such types include discontinuous filters, drum filters, continuous belt filters, continuous rotating filters, belt of tray filters, and rotating trays filters. All of these types of filters have in common the characteristic that the filtering surface moves with the filter cake during filtration while the slurry and washing liquids are fed at fixed positions.

Of the above set forth filter types, the drum filters, which have been in use the longest, are probably the simplest in construction but they can be employed only for about one washing and are not suitable for use with various types of slurry materials, particularly phosphoric acid. The other filters set forth hereinabove enable a filtration of slurry type materials with several, i.e., normally about three, subsequent washings of the cake. However, of these filters, the continuous belt of trays and continuous rotating trays filter types do not effect a satisfactory separation of liquids and, consequently, the filtrate resulting from the first filtration becomes mixed with the washings and is thus diluted.

The only filters presently available for accomplishing efficient results in practice are those of the belt of trays and rotating trays type. In these types of filters, in the belt of trays type, the respective trays traverse in a horizontal linear movement, and in the rotating trays type, the trays traverse in a rotary movement. The trays first receive the slurry and then receive the subsequent backwashings, the filters being subjected to a vacuum during filtration.

Both trays type filters require a complex control and guidance system for removing the trays. Furthermore, with regard to the rotating trays type filters, there are further required control and guide means for periodically overturning the trays thereof. Also in the rotating trays type filters, the rotating members have to be constituted of noble metals or metals not subject to corrosion, whereby there results expensive apparatus.

Because of the required movement of the trays in the filtering process, sliding seal members are required in the apparatus for collecting various kinds of filtered liquids from the trays, such sliding seal members being subjected to wear and undergoing vacuum losses in operation. Furthermore, it is periodically necessary to halt the operation of the filters and consequently the production processes in which they are being employed (except when standby filter apparatus may be available) to lubricate them, change their filter cloths, normally maintain them, and wash the elements transporting the filtrate in order to remove solid deposits therefrom. The latter washing requirement particularly obtains in the processing of phosphoric acid in which the only slightly soluble calcium salt deposits have to be removed. In the belt of trays type filters, a further disadvantage is presented in that they do not provide satisfactorily large working surfaces and consequently more filter units of this type are required in processing large quantities of material. There exists, at present, a still further type filter, similar to the rotating trays type filter, but differing therefrom in that, during its operation, its trays remain stationary, while the feeder and discharge mechanisms therefor are rotated. However, these reversals of rotating functions in this type of filter as compared with the hereinabove described rotating trays type filter, do not overcome the deficiencies therein and the same disadvantages are presented thereby as by the types of filters outlined above.

Accordingly, it is an important object of this invention to provide a trays type filter which is mechanically simple as compared to known type filters used for the same purpose thereby effecting reduced installation and maintenance costs.

It is another object to provide a filter constructed in accordance with the preceding object which presents comparatively large surfaces.

It is a further object to provide a filter in accordance with the preceding objects wherein deposits do not form and the need for halting a production process for normal maintenance, lubrication or changing of cloths in the filter is eliminated, uninterrupted continuous production not being dependent upon the presence of standby filter apparatus.

It is still another object to provide a filter in accordance with the preceding objects wherein relative movements between feeding members and filtering elements and the need for sliding seal members in the separation of liquids are completely eliminated, thereby making the filter considerably more vacuum-tight than has heretofore been possible.

It is still a further object to provide a filter suitable for use in enabling multiple backwashings particularly in situations where a liquid is to be separated from a very fine solid, and a thorough washing with only moderate amounts of additional liquid.

It is yet another object to provide a filter in accordance with the preceding objects which is particularly suited for the separation, by a wet process, of phosphoric acid, and for other filtering applications in the chemical industry.

Generally speaking and in accordance with the invention, there is provided a continuously operative vacuum filter capable of effecting a filtration of a slurry and a given number of subsequent backwashings of filter cake with the aforesaid given number of different washing fluids comprising a feeder-distributor stage, a vacuum filtration stage, a collector and separator stage, and a timer for controlling the synchronization of the operation of the various stages. The vacuum filtration stage comprises a chosen number of filter elements, such chosen number exceeding the given number by at least two, each of the filter elements including a normally upright vessel, outlet means for discharging filtrate fluid therefrom adapted for connection to a vacuum source and control means associated with the vessel and operative to be actuated to place the vessel in an overturned position and restore it from the overturned back to the upright position. The feeder-distributor stage comprises means for separately receiving the slurry and each of the aforesaid washing fluids, means for concurrently feeding one of the slurry and the washing fluids to each of the respective filter elements during a given time period which is an equal subdivision of a time cycle consisting of the aforesaid chosen number of time periods and for sequentially feeding the slurry and the washing fluids in a predetermined order to each of the filter elements whereby during each time cycle, each filter element sequentially receives the slurry and each of the washing fluids in the aforesaid predetermined order and is unfed during one period of the time cycle and whereby the slurry and each of the washing fluids are respectively sequentially fed to different filter elements respectively and each of the filter elements is respectively unfed in successively occurring time periods. The collector and separator stage receives the fluid filtrate outputs from the filter elements and separately collects them, the collector and separator stage including the aforesaid chosen number less one of collecting vessels and means for directing the respective same fluid from the filter elements' fluid outputs into only respective ones of the collecting vessels. The timer controls the sequential feeding of the fluids to the filter elements and controls the actuation of the filter element vessels' control means during their respective unfed periods.

The above mentioned and more specific objects and features of this invention will be apparent from, and will be mentioned in the following description of the filter according to the invention shown by way of example in the accompanying drawing in which:

FIG. 1 is a diagrammatic depiction of a filter constructed in accordance with the principles of the invention;

FIGS. 2A, 2B and 2C schematically show an illustrative embodiment of a feeder-distributor stage suitable for use in the filter shown in FIG. 1;

FIG. 4A is a diagrammatic view of the operating circuit of the timer of FIG. 1;

FIGS. 4B and 4C are diagrammatic views of two of the rotary discs of the timer shown in FIG. 4A, showing various contact settings;

Figure 1:
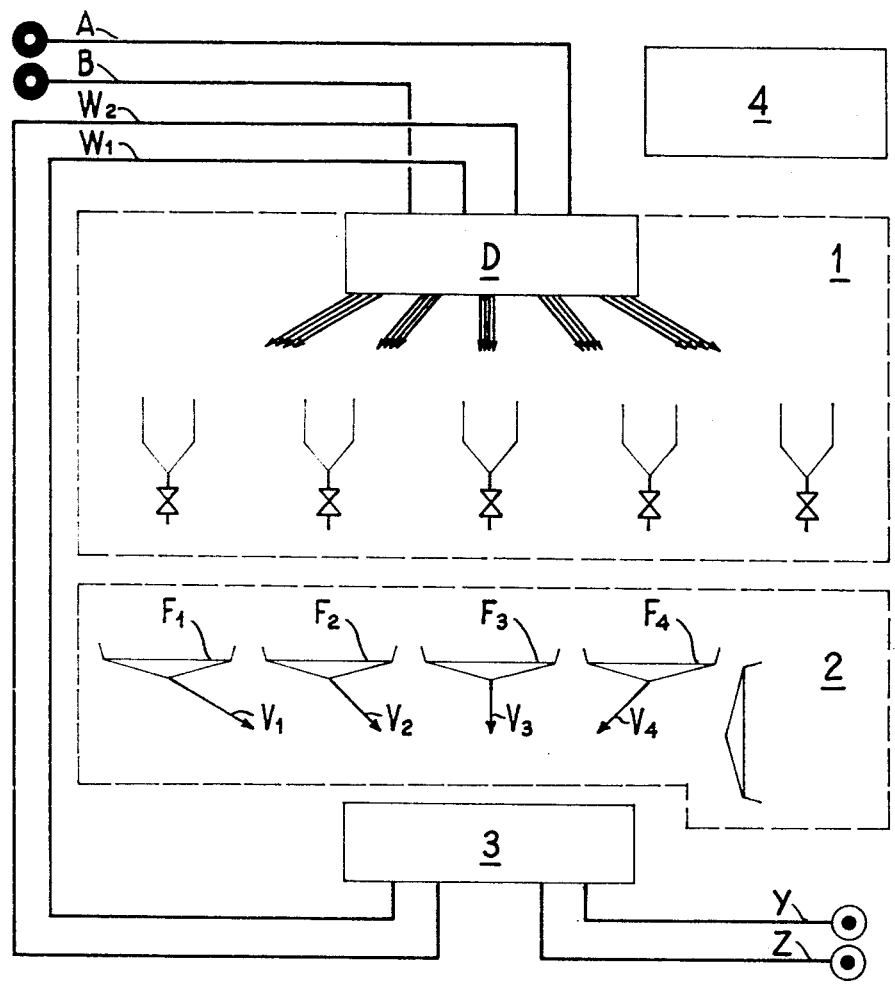
Figure 5A:
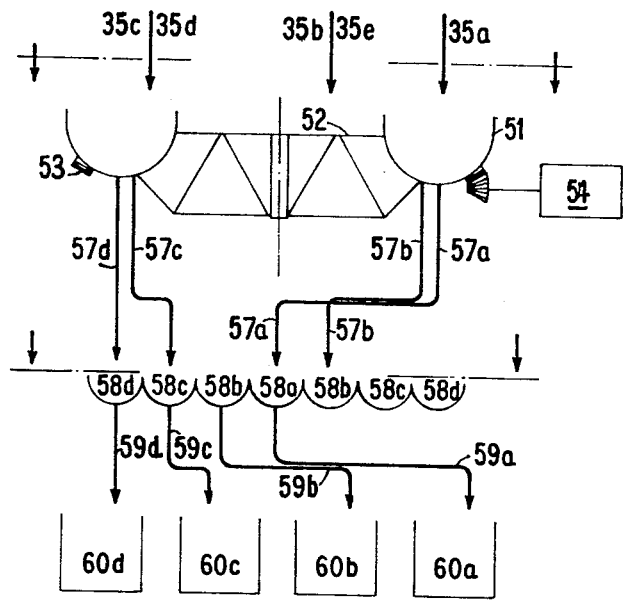
Figure 5B:
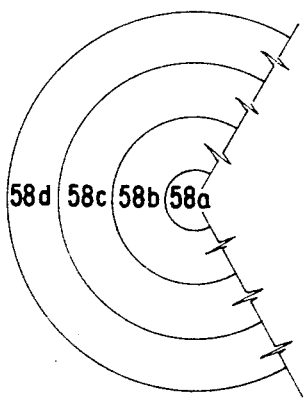
Figure 5C:
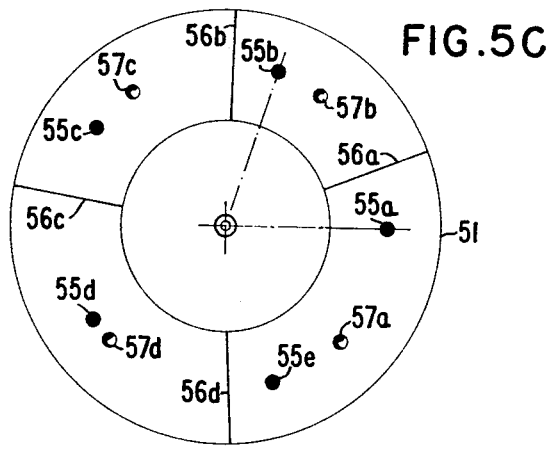
Figure 6:
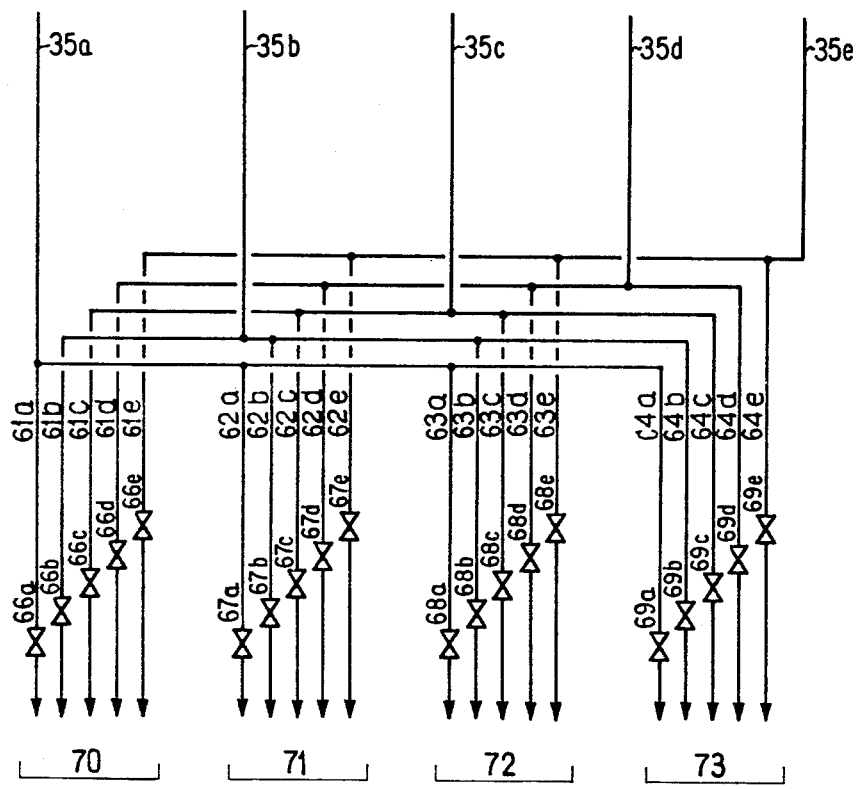

FIGS. 5A, 5B and 5C schematically show an embodiment of a collector-separator suitable for use as the collector stage of the filter of FIG. 1; and FIG. 6 is a schematic depiction of another illustrative embodiment of a collector-separator suitable for use as the collector stage of the filter of FIG. 1.

Prior to describing the structure and operation of the invention as depicted in the accompanying drawing, there follows hereinbelow a glossary of terms employed herein to describe and designate the various materials and operations respectively pertinent thereto.

Glossary

Slurry—The suspension in which the liquid component is to be separated from the solids component.
Filtrate—The liquid constituting the slurry after the solid has been separated therefrom.
Fresh solvent—The fresh liquid utilized for backwashing the cake (water in the case of phosphoric acid).
First washing—The liquid resulting from the washing of the cake with fresh solvent.
Second washing—The liquid resulting from the washing of the cake with the first washing.
Third washing—The liquid resulting from the washing of the cake with the second washing. Also referred to as the "washing solution."

In FIG. 1 wherein there is schematically depicted a filter constructed in accordance with the principles of the invention, the filter can be conceptually described as comprising four coacting components, viz., a feeder and distributor stage 1, a vacuum filtration stage 2, a collector-separator stage 3, and a timer 4.

In considering the operation of this filter, if it is assumed that filtration has proceeded to the point wherein all the components as set forth in the glossary hereinabove are being produced and handled by the filter, a distributor D in feeder and distributor stage 1 has fed thereto the slurry to be filtered and the fresh solvent respectively designated by the letters A and B, and the first and second washings recycled from the output of collector stage 3.

Through the operation of distributor D, the four different fluids introduced into distributor D are fed therefrom to the respective filter elements or groups of filter elements comprising the filtration stage 2, four of these filter elements being designated with the notations $F_1$ to $F_4$, respectively. As will be further explained hereinbelow, the four different separated fluids from distributor D are fed therefrom cyclically in a synchronized timing sequence to the filter elements in vacuum filtration stage 2. It is noted that filtration stage 2 is shown as including a fifth and overturned filter element. As will be further explained hereinbelow, such fifth element is utilized to receive the cake and to be overturned to discharge the cake to conveying apparatus.

To further illustrate the operation of feeder and distributor stage 1 and vacuum filtration stage 2, let it be assumed that filter elements $F_1$ to $F_4$ at the same point in a given cycle have respectively been feed slurry, fresh solvent, first washing and second washing simultaneously and the fifth filter element has cake therein. At the next point in this cycle, filter elements $F_2$, $F_3$, $F_4$, and the fifth filter element simultaneously receive slurry, fresh solvent, first washing and second washing respectively and filter element $F_1$ is unfed. The notations $V_1$, $V_2$, $V_3$ and $V_4$ are shown as designating the fluid outputs of filter elements $F_1$ to $F_4$. However, as explained hereinabove, all five filter elements sequentially cyclically receive each of the respective fluids whereby the designations $V_1$ to $V_4$ illustrate a point in a cycle when the fifth element is unfed. The four fluid outputs $V_1$ to $V_4$ of vacuum filtration stage 2 are the filtrate and the first, second and third washings. As will be further explained hereinbelow, means are included in filtration stage 2 to cut off the vacuum from the filter element which is unfed at a given point in the cycle and to overturn it to cause it to discharge the cake.

In collector stage 3, the fluids $V_1$ to $V_4$ are received and separated, the first and second washings being recycled by being fed back to distributor D, the filtrate and the third washing, or washing solution, designated by the notations Y and Z, being eliminated from the filtration cycle.

It is realized that at the initiation of a filtration process, only fresh solvent and slurry are first available for introduction into distributor D. As the process proceeds, at a succeeding point therein, first washing solution is produced from the output of collector stage 3, the feeding of such first washing solution back to distributor D effecting the production of second washing solution. At this point, all of the fluids of the filtration cycle are present.

The timer 4 is constructed to synchronously control the timing of the operation of feeder and distributor stage 1 and collector-separator stage 3, the timing for cutting off the vacuum from the unfed filter element in the vacuum filtration stage 2 and also controls the sequential feeding of the filter elements cyclically with the different filtration products to insure that a feeding to a filter element takes place only when the immediately preceding material fed to such element has been completely removed therefrom.

A sixth standby filter element (not shown) may be utilized to enable the removal of one of the operating filter elements for changing its cloth, or maintenance or lubrication thereof without materially interrupting the production process which includes the filtration process.

It is to be appreciated from the foregoing description that since the different liquids sequentially pass through the respective components of the filter, particularly the filter elements which are subjected to a vacuum, deposit forming during the filtration of the slurry which is a detrimental factor in the operation of known filters is prevented with the filter of the invention since any deposit about to be formed therein is rapidly dissolved by the receiving thereby of the next liquid fed thereto in the sequential feeding cycle. Thus, one of the most frequent causes of periodic halts in the operation of known filters with its consequent interruption of production is eliminated.

Figure 2A:
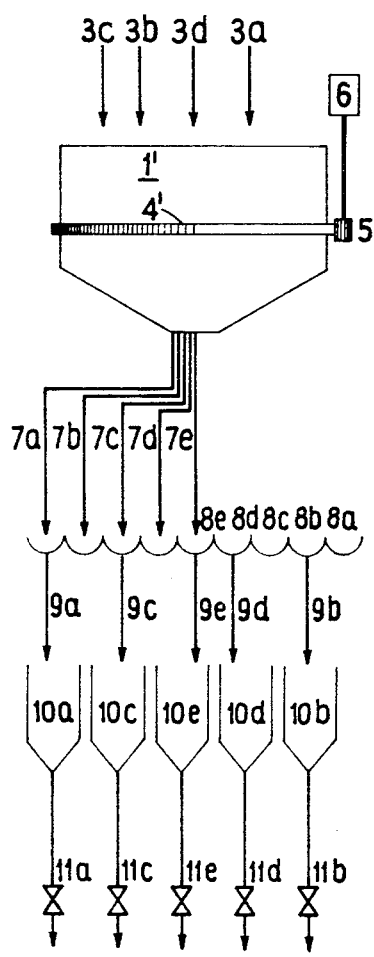
Figure 2B:
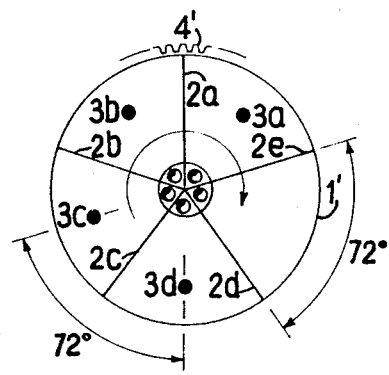

In FIGS. 2, 2A, 2B and 2C wherein there is schematically depicted an illustrative embodiment of a feeder-distributor constructed in accordance with the principles of the invention, a cylindrical vessel 1' which may have a frusto-conical lower portion to facilitate fluid flow therein is subdivided into substantially five equal compartments by radially disposed baffles 2a, 2b, 2c, 2d and 2e. Vessel 1' has fluid introduced thereinto by four pipes schematically depicted by arrows 3a, 3b, 3c and 3d. As shown in FIG. 2B, pipes 3a, 3b, 3c and 3d are disposed whereby they are radially equidistant from the central vertical axis of vessel 1' and are equiangularly displaced from each other, i.e. by 72°. Through pipes 3a, 3b, 3c and 3d, slurry, fresh solvent, and first and second washings are introduced into vessel 1', vessel 1' being rotated in a horizontal plane by suitable means such as a crown gear 4' which cooperates with a gear 5 that is operated by a suitable control which may be mechanical and is schematically depicted by element 6.

The element 6 is basically formed by an electric motor and a mechanical reduction system, for instance gears, V-belts or chains, designed to provide a ratio of reduction to obtain a complete rotation of vessel 1' in the most convenient time for best operation, generally from two to six minutes. The time adjustment can be obtained by suitably adjusting the control element 6, e.g. by changing the diameter of the gears, the pulleys or the V-belts. The timer 4 of FIG. 1 performs a complete cycle during a complete revolution of vessel 1' and is electrically or mechanically connected to the control 6.

From the base of vessel 1', there emerge five pipes, shown schematically as arrows 7a, 7b, 7c, 7d and 7e, these pipes being attached to vessel 1' whereby they are rotated therewith, each of these five pipes respectively communicating with one of the five compartments in vessel 1' as defined by baffles 2a, 2b, 2c, 2d and 2e. Each of pipes 7a to 7e respectively communicates with and otherwise feeds fixed ducts 8a, 8b, 8c, 8d and 8e, ducts 8a to 8e being concentrically disposed in a substantially horizontal planar array. Five pipes, as shown by arrows 9a, 9b, 9c, 9d and 9e communicate with and lead from ducts 8a to 8e to correspondingly feed five vessel 10a, 10b, 10c, 10d and 10e, which in turn feed the five filtering elements schematically shown as valves 11a, 11b, 11c, 11d and 11e.

Figure 2C:
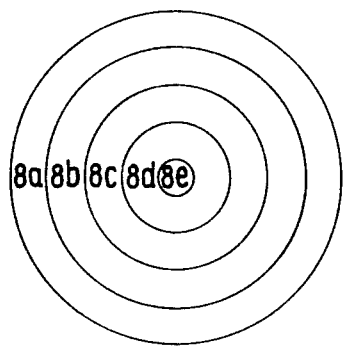

In considering the operation of the distributor shown in FIGS. 2A, 2B and 2C, it is seen that during the time for a one-fifth turn of vessel 1', four of the five compartments therein as defined by baffles 2a to 2e and consequently four of the five pipes 7a to 7e, four of the five ducts 8a to 8e, four of the five pipes 9a to 9e, and four of the five vessels 10a to 10e are fed with the same respective fluid from pipes 3a to 3d respectively while the remaining respective fifth vessels and pipes are not fed. During the next one-fifth turn of vessel 1', the respective unfed fifth compartment of vessel 1' and the corresponding pipes and vessel associated therewith receives a fluid. It is assumed that the latter fluid is the fresh slurry, the one that had the one that had recevied the second washing now receives received the fresh slurry now receives the second washing, the first washing, the one that had received the first washing receives the fresh solvent, and the one that had received the fresh solvent now remains unfed.

The valves 11a to 11e, placed at the outlets of vessels 10a to 10e, are controlled to be automatically opened and closed in accordance with a given timing arrangement by timer 4, their opening and closing times being so chosen whereby fluids are discharged from vessels 10a to 10e through valves 11a to 11e into the vessels of the filter elements when the fluid introduced into the filter element vessels in the immediately proceding one-fifth of the cycle have been completely removed therefrom to avoid the mixing of respective entering and departing fluids in the filter element vessels.

It is thus seen that with the distributor of FIGS. 2A to 2C, each of the five filter elements can sequentially receive slurry, second washing, first washing and fresh solvent in four-fifths of a cycle and in the remaining fifth of a cycle be unfed with a fluid whereby it can discharge the washed cake. It is further seen that a different fifth of the cycle of operation simultaneously takes place on the respective filter elements.

Figure 3:
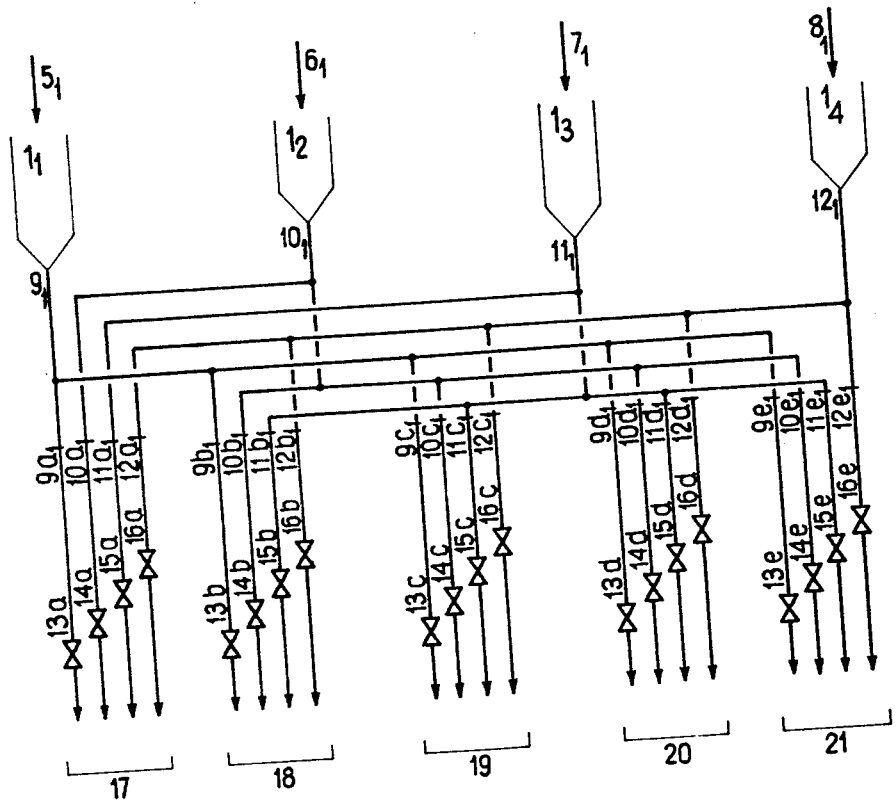
FIG. 3 shows another illustrative embodiment of a feeder-distributor stage suitable for use in the filter of FIG. 1.

In FIG. 3, wherein there is shown another embodiment of a distributor constructed in accordance with the principles of the invention, four vessels respectively numerically designated $1_1$, $1_2$, $1_3$ and $1_4$ are fed with the four different fluids, viz., slurry, second washing, first washing and fresh solvent by four pipes as schematically depicted by arrows $5_1$, $6_1$, $7_1$, and $8_1$. Communicating with and leaving each vessel $1_1$, $1_2$, $1_3$ and $1_4$ are sets of pipes $9_1$, $10_1$, $11_1$ and $12_1$, each of these sets correspondingly comprising five pipes, viz, $9_1$ to $9e_1$, $10a_1$ to $10e_1$, $11a_1$ to $11e_1$ and $12a_1$ to $12e_1$. Each of these pipes leads into a valve, pipes $9a_1$ to $9e_1$ correspondingly leading into valves 13a to 13e, pipes $10a_1$ to $10e_1$ leading into the valves 14a to 14e, pipes $11a_1$ to $11e_1$ leading into valves 15a to 15e and pipes $12a_1$ to $12e_1$ leading into valves 16a to 16e. As shown in FIG. 3, all pipes and valves having the same alphabetic character designation feed the same filter element respectively. Thus, valves 13a to 16a feed filter element 17, valves 13b to 16b feed filter element 18, valves 13c to 16c feed filter element 19, valves 13d to 16d feed filter element 20 and valves 13e to 16e feed filter element 21.

If it is assumed that the first fifth of an arbitrarily chosen filtration cycle begins at a given point and that when it completes a fifth of a cycle, the period between such beginning and completion is considered a first period, then the tabulation hereinbelow indicates the timing cycle and order for opening the twenty valves in the distributor of FIG. 3.

| Period: | Valves concurrently open |
| --- | --- |
| 1st | 13a, 14b, 15c, 16d. |
| 2nd | 13e, 14a, 15b, 16c. |
| 3rd | 13d, 14e, 15a, 16b. |
| 4th | 13c, 14d, 15e, 16a. |
| 5th | 13b, 14c, 15d, 16e. |
| 6th | Same as first period. |

From the foregoing table it is seen that each respective filter element 17 to 21 is sequentially fed with one of the four fluids in four period of the cycle and is unfed for one period in the cycle, such unfed period being the period that it is overturned.

Figure 4:
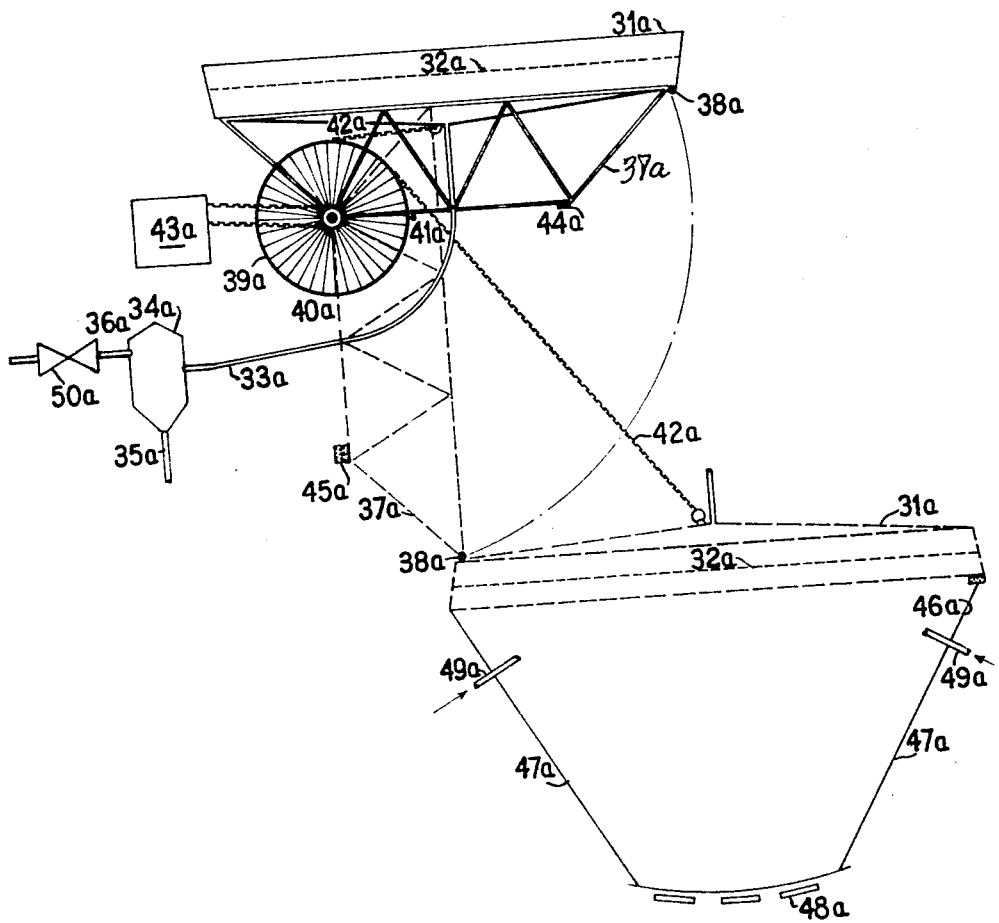
FIG. 4 is a schematic view of a structure suitable for use as a filter element in the filtration stage of the filter of FIG. 1.

In FIG. 4, wherein there is shown an embodiment of one filter element constructed in accordance with the principles of the invention, there is included a vessel 31a having a suitable shape and a bottom and lateral walls, a grate 32a or other suitable support structure being contained within vessel 31a for carrying a filtering cloth thereon. As shown in FIG. 4, vessel 31a may be of rectangular or trapezoidal configuration with the bottom sloping slightly downwardly toward its center. An outlet in the bottom of vessel 31a is connected through a flexible tube 33a to a liquid-separating vessel 34a, vessel 34a being connected to an element in the collector-separator stage through a pipe 35a and adapted to be connected to a vacuum source (not shown) through a pipe 36a and a valve 50a.

Vessel 31a is supported by a frame 37a and rotatably attached to it along an axis of rotation 38a. Frame 37a is attached to a rotatable shaft 39a which is suitably arranged to rotate on supports affixed to an outer frame (not shown) and onto which, a grooved wheel 40a is keyed in neutral.

Wheel 40a is provided with a tooth 41a on which frame 37a rests and is attached to frame 37a with a wire 42a wound around the outside and affixed to vessel 31a at one of its ends. Wheel 40a is also controlled by a control mechanism schematically depicted as stage 43a which may suitably be an externally located mechanical, hydraulic or similar type winch.

The control mechanism of stage 43a may be, for example an electric motor and a mechanical reduction system having gears, V-belts or chains or the like, and having reversible movement. The control mechanism, which acts upon the wheel 40a turning about the axis 39a, begins moving in one rotary direction (clockwise in FIG. 4) when it receives an electric pulse signal from the timer 4.

If it is assumed that the filter element shown in FIG. 4 is the one which is unfed, when the washing of the cake thereon on the cloth on grate 32a is completed, mechanical or other type winch 43a commences to operate to turn wheel 40a in a clockwise direction on shaft 39a as viewed in FIG. 4, frame 37a continually remaining supported by tooth 41a and filter element 31a placed thereon. Frame 37a is rotated to the point at which lug 44a on and suitably integral with frame 37a encounters lug 45a on the outer frame in its rotational path. Thereafter, the rotation of vessel 31a with respect to frame 37a commences around axis of rotation 38a while wire is concurrently unwound from wheel 40a.

The rotation wheel 40a continues until vessel 31a is completely overturned and has reached the position shown in FIG. 4 by the dashed line outline thereof, at such completely overturned position, vessel 31a coming to rest against a support 46a which is attached to the outer frame. For stop-control of the vessel 31a, the support 46a may be provided with an electric end-of-stroke device such as a solenoid that stops the winch 43a and subsequently causes the beginning of the movement thereof in the opposite rotary sense (counterclockwise in FIG. 4). The filter cake which is discharged from vessel 31a by its overturning is collected with the aid of converging slide elements 47a onto a transporting element 48a which effects its removal, the vacuum being removed to facilitate discharging through control of the timer. Respective groups of nozzles 49a may be included, disposed as shown in FIG. 4, to periodically produce spouts of water for washing the filtering cloth once the filter cake has been discharged from vessel 31a while it is in its overturned state.

The aforementioned nonillustrated end-of-stroke device located at support 46a can control the discharge of water from the nozzles 49a for washing the filter-cloths, the water discharge ending when the filtering element is again raised to the solid-line position thereof shown in FIG. 4.

To raise the filtering element, the rotation of wheel 40a in the opposite direction (counterclockwise) is commenced to take up wire 42a and the rotation of wheel 40a is continued until frame 37a and vessel 31a attain their normal upturned initial positions.

Though not illustrated, it should be understood that, besides the filtering element and associated elements shown in FIG. 3, the filter of my invention includes four more similar filtering elements and respective associated elements. The filtering element of FIG. 4 and its associated elements are identified by a reference character having a subscript a and the four nonillustrated filtering elements and respective associated elements will be identified when referred to hereinafter with the same reference characters respectively, except that the subscripts will be b, c, d and e respectively.

The timer 4 (FIG. 1) provided for the control of filter operation may be of the mechannical or of the electronic type, and should carry out a series of operations of cyclic nature on the valves 11a, 11b, 11c, 11d, 11e of FIG. 2A, on the filtering elements $F_1$ to $F_4$ of FIG. 1 and 31a to 31e as in FIG. 4, and on the valves 50a to 50e (only 50a shown in FIG. 4) connecting the filtering elements 31a to 31e with the source of the vacuum placed on the tubes 36a to 36e (only 36a shown in FIG. 4).

In FIG. 3A there are diagrammatically shown electrical connections between the timer 4 of FIG. 1 and the just-mentioned members 11a to 11e, 31a to 31e and 50a to 50e. Every cycle of time, after the elapse of which the identical operations are repeated, is subdivided into a number of equal parts, corresponding to the number of filtering elements (five in the illustrated example) which are referred to hereinafter as fractions of a cycle. During every fraction of a cycle, analogous operations are performed, which are however, not equal to those of the preceding fraction. At the beginning of each fraction of cycle (time $T_0$), the valves 11a, 11b, 11c, 11d, 11e (opened during the preceding fraction) are closed. During the fraction of cycle, the complete action of tilting and relifting the filtering element previously in motion is terminated. One of the valves 50a to 50e is opened, e.g., valve 50a. The rotation of the corresponding filtering element vessel 31a to 31e begins with a tilting movement and then follows with a lifting or restoring movement. At intervals of time predetermined by the timer 4, four of the valves 11a, 11b, 11c, 11d, 11e are opened, in the example chosen all except the valve 11a.

At the end of the fraction of cycle (time $T_0+\Delta T=T_1$), the four open valves 11b, 11c, 11d, 11e are closed simultaneously. The sequence of the operations for the first two fractions of cycle is given in the tabulation hereinbelow in which:

$T_0$ is the initial "instant" (moment of time)
$\Delta t_0$ is an adjustable time interval, lower than $\Delta t$
$\Delta t$ is an adjustable time interval, lower than $\Delta T$
$\Delta t_1, \Delta t_2, \Delta t_3, \Delta t_4$ are adjustable time intervals, greater than $\Delta t$, but smaller than $T_1-T_0$, and define respectively the beginning of the filtration of the first, second and third washing
$\Delta T = T_1 - T_0 = T_2 - T_1$, etc., is the duration of a fraction of period
$T_0$=start of the cycle with closure of the valves 11a, 11b, 11c, 11d previously open
$T_0+\Delta t_0$=return of filtering element vessel 31e, previously in movement, to the rest position
$T_0+\Delta t$=closure of the valve 50e previously open; opening of valve 50a and beginning of the tilting of vessel 31a with a reciprocatory stroke
$T_0+\Delta t_1$=opening of valve 11e
$T_0+\Delta t_2$=opening of valve 11d
$T_0+\Delta t_3$=opening of valve 11c
$T+\Delta t_4$=opening of valve 11b
$T_1(=T_0+\Delta T)$ end of the cycle
$(T_1)$=beginning of the cycle with closure of valves 11b, 11c, 11d, 11e previously open
$(T_1+\Delta t_0)$=return of 31a to rest position
$(T_0+\Delta t)$=closure of valve 50a previously open; opening of valve 50b and beginning of the tilting of the filtering element associated with valve 50a with reciprocatory stroke
$T_0+\Delta t_1$=opening of valve 11a
$T_0+\Delta t_2$=opening of valve 11e
$T_0+\Delta t_3$=opening of valve 11d
$T_0+\Delta t_4$=opening of valve 11c
$T_2(=T_1+\Delta T)$ end of the cycle In view of the cyclic nature of the timing operation just described, after five fractions of cycle, the fraction of cycle first described above is repeated exactly. Timers of the mechanical and electronic types adapted to perform the above-described tasks are known in the art. If the timer is of the mechanical type, it may include five coaxially rotating discs, each individually provided with an electric contact 72° out of phase with one another, which during rotation thereof close the respective circuits corresponding to the individual operations.

In FIGS. 4B and 4C there are shown two of the rotary discs, and the respective electric contacts are indicated by arrows, which are located between a rotary part (RI° for the first disc, RII° for the second disc), and a fixed part (SI° for the first disc, SII° for the second disc).

The contacts of the rotary parts RI° and RII°, during their rotation, engage all of the contacts of the respective fixed parts SI° and SII° and cause the activities indicated in FIGS. 4B and 4C. The needle contact of rotary part RII° is 72° out of phase with that of rotary part RI°. The contacts 11a to 11e are regularly displaceable since the corresponding contacts (e.g. 11b of the first disc of FIG. 4B and 11c of the second disc of FIG. 4C, etc.) are rigidly connected with each other and so are also the contacts 50a to 50e and 31a to 31e on respectively and 50a to 59e off, the latter contact being offset 72°. The contacts 11a to 11e off are fixed. On the discs RI° and RII° there are indicated, by solid lines, the contact indices shown as an arrow, whereas the contact indices of the nonillustrated underlying discs RIII°, RIV° and RV° are shown by dotted lines. The valves 50a to 50e and 11a to 11e are valves of the "all-or-nothing" type, namely of the quick opening and closing type such as solenoid or pneumatically controlled valves, as indicated in FIG. 4A.

In FIGS. 5A, 5B and 5C, wherein there is diagrammatically depicted an illustrative embodiment of a collector-separator constructed according to the invention, the output of the filter elements which passes through a pipe 35a as shown in FIG. 4, for example, is fed to the collector-separator stage through five such pipes respectively as shown by the arrows designated with the notations 35a, 35b, 35c, 35d and 35e. It is realized that the function of the collector-separator stage is to maintain the four fluids, viz., filtrate and first, second, and third washings, produced at the output of the vacuum filtration stage, qualitatively separated.

In the collector-separator stage, per se, there is provided a vessel 51 which may suitably be a toroidal conduit, supported by a frame 52. Vessel 51 and its support 52 are adapted to be rotated by suitable rotating means with respect to a vertical axis, the rotating means being shown in FIG. 5A as a gear 53 controlled by a control element 54. This rotation is suitably synchronized with the rotation of the vessels shown in FIGS. 2A to 2C.

The pipes 35a to 35e feed vessel 51 at five angularly equispaced different points, i.e., 72° between points, which lie in a circle concentric with the circumferential perimeters of vessel 51. Here again, as with the other structures of the filter, the pipe of pipes 35a to 35e which is the outlet for the filter element that is unfed and is overturned in a given fifth of a cycle has no fluid flowing therethrough for the feeding thereof into its opposing portion of vessel 51, the filtrate and first, second and third washings being fed through the other of pipes 35a to 35e during this given point of the cycle to the portions of vessel respectively there opposing.

With the rotating of vessel 51 of FIGS. 5A to 5E in synchronism with the rotation of vessel 1' of FIGS. 2A to 2C, during a complete rotation, each of pipes 35a to 35e is sequentially fed with each of the four liquids and then is not fed in the five subdivisions of a cycle.

To effect the maintaining of the separation of the four liquids fed to vessel 51, it is divided into four compartments by radially disposed baffles 56a, 56b, 56c, and 56d, each of the resulting four compartments being provided with an outlet, viz., outlets 57a, 57b, 57c and 57d. The angular displacements of baffles 56a to 56d with respect to each other can be chosen such that they arrive beneath pipes 55a to 55e respectively when there is a change in the flow of fed liquid from one type to another. This arrangement is particularly pertinent with regard to baffles 56a, 56b and 56c. However, baffle 56d has to be located such that it comes into position beneath a pipe of pipes 55a to 55e when the flow is interrupted just prior to the change to a different fluid flow. With such arrangement, there is enabled the feeding of the same fluid sequentially into any of the four respective compartments into which vessel 51 is subdivided by baffles 56a to 56d whereby there always passes through outlets 57a to 57d respectively the same of the four fluids, each outlet, of course, having flowing therethrough a different one of the fluids.

A collector in the collector-separator stage comprises four fixed toroidal ducts 58a, 58b, 58c, and 58d concentrically coplanarly disposed which collects the liquids flowing through outlets 57a to 57d and which discharges these liquids through pipes 59a, 59b, 59c and 59d into four vessels 60a, 60b, 60c and 60d from which they are adapted to be removed by a suitable pumping arrangement (not shown), the filtrate and third washings being eliminated and the first and second washings being recycled to the distributor.

In FIG. 6 wherein there is shown another embodiment of a collector-separator, the five pipe outlets from the filter elements, viz., pipe 35a to 35e each multifurcate into four subdivisions, i.e., pipe 35a subdivides into pipes 61a to 64a, pipe 35b subdivides into pipes 61b to 64b, pipe 35c subdivides into pipes 61c to 64c, pipe 35d subdivides into pipes 61d to 64d, and pipe 35e subdivides into pipes 61e to 64e. Each of these pipes lead into valves respectively correspondingly designated by the same alphabetic character notation, i.e., pipes 61a to 64a lead into valves 66a to 69a, pipes 61b to 64b lead into valves 66b to 69b, pipes 61c to 64c lead into valves 66c to 69c, pipes 61d to 64d lead into valves 66d to 69d and pipes 61e to 64e lead into valves 66e to 69e.

Since four of the five pipes 35a to 35e concurrently discharge four different liquids respectively, by opening the valves shown in FIG. 6 in accordance with the hereinbelow set forth tabulation while the total valve operation period is synchronized with the feeding and overturning of the filter elements, there is effected the maintaining of separation between the four different liquids and the separate collecting thereof in four different vessels 70, 71, 72 and 73 respectively.

The sequence of valve openings tabulation follows. As previously utilized hereinabove, the term "period" signifies one-fifth of a cycle.

| Period: | Valves concurrently open |
| --- | --- |
| 1st | 66a, 67b, 68c, 69d, 69e. |
| 2nd | 66e, 67a, 68b, 69c, 69d. |
| 3rd | 66d, 67e, 68a, 69b, 69c. |
| 4th | 66c, 67d, 68e, 69a, 69b. |
| 5th | 66b, 67c, 68d, 69e, 69a |
| 6th | Same as first period |

The different liquids respectively collected in vessels 70 to 73 are suitably removed therefrom by a pumping arrangement not shown and disposed of or recycled as required. Thus, if the filtrate and third washing are received in vessels 70 and 71 respectively and the second and first washings are respectively received in vessels 72 and 73, the contents of vessels 70 and 71 are disposed of and the contents of vessels 72 and 73 are recycled to constitute the first and second washings fed to the distributor.

*Example*

Filtering of a slurry coming from a phosphoric acid manufacturing plant is carried out in a filter composed of six filtering elements (one in reserve) each having an area of five square meters. The slurry has the following composition:

liquid—50 tons/hour, specific gravity 1.3 kg./dm.$^3$, with 30% of $P_2O_5$, 70° C.;

solid—30 tons/hour, specific gravity 2.7 kg./dm.$^3$, essentially $CaSO_4 \cdot 2H_2O$.

The feeder distribution stage 1 of FIG. 1 receives four different flows which are:

the above-mentioned slurry (A) having a flow rate of 80 tons/hour or 49.6 cubic meters/hour;

fresh solvent (B), water at 60° C. at 35 cubic m./hr.;

first washing (W1) coming by pump from the collector stage 3 with flow rate of 36 tons/hour (35.5) cubic meters/hour) and second washing (W2) coming by pump from the collector stage 3 with a flow rate of 40 tons/hour (36 cubic meters/hour).

The feeder distributor feeds the four liquids by natural gravity flow to four of the five filtering elements, namely the operative elements $F_1$, $F_2$, $F_3$, $F_4$ in the stage 2 (FIG. 1).

Th rotation of the feeder-distribution lasts four minutes and thirty seconds altogether, and the period of the timer controlling the valves is identical; during that rotation, each filtering element receives successively the four individual fluids in amounts corresponding to the flow rates given above for a duration of 54 seconds.

In each operation of 4 minutes and 30 seconds duration there is thus filtered, washed and discharged an amount of 450 kg. of gypsum simultaneously in five different filtering elements. From the filtering elements, passing through the vessel 34a of FIG. 4, four different flows issue by natural gravity at the collector stage 3, namely:

20 tons/hour (=15.4 cubic meters/hour) of "filtrate" Y with 30% of $P_2O_5$ (namely 6 tons/hr. of $P_2O_5$), which constitutes the product coming from the filtration of the slurry;

44.3 tons/hour (=37.5 cubic meters/hour) of third washing Z, which comes from the cakes washed with the second washing W2 and recycles to the exterior, to the location of the reaction between sulfuric acid and phosphate rock;

40 tons/hour (=36 cubic meters/hour) of second washing W2 coming from the cakes washed with the first washing W1 and which recycles to the "feeder collector stage"; and 36 tons/hour (=35.5 cubic meters/hour) of first washing W1 which comes from the cakes washed with the fresh solvent B (water) and recycles to the feeder collector stage.

The liquids are taken up at the outlet of the collector stage from which they leave by gravity, and by means of a pump they are conveyed to the aforementioned locations (also see FIG. 1). In this manner, it is possible to filter 144 tons/day of $P_2O_5$. Every 2 days or so the filtering cloths became clogged and must be washed thoroughly or replaced. To that end, about every 10 hours one of the filtering elements previously used was replaced by the reserve filtering element, and the cleansing or replacing of the cloths was then carried out, taking about 2 or 3 hours. After this cleansing the reserve element was returned to reserve status, and thereby was made available for any unforeseen damage of another element. Thus a possibility is afforded to completely avoiding any stoppage or shutdown for long periods of time.

From the foregoing it is seen that in accordance with the invention, there is provided a filter which is relatively mechanically simple and in which relative movements between feeding members and filtering elements and sliding seals for the separating of liquids are completely eliminated. Nor can deposits form therein.

It will be obvious to those skilled in the art upon studying this disclosure that filters according to this invention permit of a great variety of modifications and hence can be given embodiments other than those particularly illustrated and described herein without departing from the essential features of the invention and within the scope of the claims annexed hereto.

What is claimed is:

1. A continuously operative vacuum filter capable of effecting a filtration of a slurry and a given number of subsequent backwashings of filter cake with said given number of different washing fluids comprising: a vacuum filtration stage comprising a chosen number of filter elements, said chosen number exceeding said given number by at least two, each of said filter elements including a normally upright vessel, outlet means for discharging filtrate fluid therefrom and adapted for connection to a vacuum soucre and control means associated with said vessel and operative to be actuated to place said vessel in an overturned position and to restore it from said overturned back to its upright position while cutting it off from said vacuum source; a feeder-distributor stage comprising means for separately receiving said slurry and each of said washing fluids, means for concurrently feeding one of said slurry and said washing fluids to each of said respective filter elements during a given time period which is an equal subdivision of a time cycle consisting of said chosen number of time periods and for sequentially feeding said slurry and said washing fluids in a predetermined order to each of said filter elements whereby during each time cycle, each filter element sequentially receives said slurry and each of said washing fluids in said predetermined order and is unfed during one period of said cycle and whereby said slurry and each of said washing fluids are respectively sequentially fed to different filter elements respectively and each of said filter elements is respectively unfed in successively occurring time periods; a collector stage for receiving the fluid otuputs from said filter elements and for separately collecting them, said collector stage including said chosen number less one of collecting vessels and means for directing the same fluids from said fluid outputs into only respective ones of said vessels; and timing means for controlling the sequential feeding of said fluids and said slurry to said filter elements for controlling the actuation of said filter element vessels' control means during said unfed periods, and for controlling the cutting off of said respective filter elements from said vacuum source during said unfed periods.

2. A continuously operative vacuum filter capable of effecting a filtration of a slurry and $n$ subsequent sequential backwashings of the filter cake resulting from said filtration with $n$ washing fluids comprising: a vacuum filtration stage comprising $n+2$ filter elements, each of the filter elements comprising a normally upright vessel, outlet means communicating with said vessel for discharging fluid therefrom and adapted for connection to a vacuum source and control means associated with said vessel and operative to be actuated to place said vessel in an overturned position and to restore it from said overturned position back to its upright position while cutting it off from said vacuum source; a feeder-distributor stage comprising means for separately receiving said slurry and each of said washing fluids, means for concurrently feeding one of said slurry and said washing fluids to each of said respective filter elements during a given time period which is an equal subdivision of a time cycle consisting of said $n+2$ time periods and for sequentally feeding said slurry and said washing fluids in a predetermined order to each of said filter elements whereby during each time cycle, each filter element sequentially receives said slurry and each of said washing fluids in said predetermined order and is unfed during one period of said cycle and whereby said slurry and each of said washing fluids are respectively sequentially fed to different filter elements respectively and each of said filter elements is respectively unfed in successively occurring time periods; slurry, filtrate fluid and first to $n$th washing fluids being produced from said filter elements; a collector stage for receiving the fluid outputs from said filter elements and for separately collecting them, said collector stage including $n+1$ collecting vessels, means for directing the same fluids from said filter elements' fluid outputs into only respective ones of said collecting vessels, and means for recycling chosen ones of said filter elements washing fluids outputs as said washing fluids fed to said feeder-distributor stage, and timing means for controlling the sequential feeding of said fluids and said slurry to said filter elements for controlling the actuation of said filter element vessels' control means during said unfed periods, and for controlling the cutting off of said filter elements from said vacuum source during said unfed periods.

3. A continuously operative vacuum filter as defined in claim 2 where $n$ is equal to 3 and said washing fluids comprise a fresh solvent, a second washing fluid and a first washing fluid, the predetermined order of feeding said fluids to a filter element being slurry, second washing fluid, first washing fluid and fresh solvent, said first washing fluid resulting from the washing of said filter cake with said fresh solvent, said second washing fluid resulting from the washing of said cake with said first washing fluid, said first and second washing fluids produced from said filter elements being said fluids recycled to said distributor.

4. A continuously operative vacuum filter as defined in claim 2 wherein said timing means is operative to control said sequential feeding of said fluids to said respective filter elements only after the fluids fed in the period immediately preceding a given period feeding have been discharged from said elements to thereby insure the separation of said fluids.

5. A continuously operative vacuum filter as defined in claim 2 wherein there is further provided $n+1$ conduits for feeding said slurry and said washing fluids to said feeder-distributor stage and wherein said feeder-distributor stage comprises $n+1$ containers in opposing relationship with the ends of said conduits for receiving the slurry and fluids therein respectively, outlet means from each of said containers, each of said outlet means multifurcating into $n+2$ tubes respectively, time controlled $(n+1)$ $(n+2)$ valves for each of said tubes to discharge through respectively corresponding ones of each of said tubes and their associated valves arranged to discharge into one of said filter elements, the timing of the openings and closings of said valves being controlled whereby $n+1$ of said filter elements concurrently receives a different one of said slurry and one remains unfed and whereby each of said slurry and said fluids are sequentially fed to said filter elements respectively in successively occurring time periods.

6. A continuously operative vacuum filter as defined in claim 2 wherein each of said filter elements comprises a normally upright filtering vessel for receiving each of said slurry and said fluids sequentially respectively from said feeder-distributor stage during successively occurring periods, a frame for supporting said vessel, said vessel being rotatably attached to said frame along an end edge thereof, rotatable means operatively associated with said frame and said vessel for rotating in opposite directions said frame and vessel vertically about a horizontal axis near the other end of said frame, first stop means disposed to halt the rotation in one direction of said frame about said axis after about 90° of said rotation, whereby said vessel rotates about said one edge to an overturned position, second stop means for halting the rotation of said vessel when it is in a substantially overturned horizontal position, and means included in said rotating means which in response to the rotating of said rotating means in the direction opposite to said one direction restores said vessel to its supported position on said frame and restores said vessel and support to said upright position, said rotating means being controlled by said timing means to be actuated into said rotations during the unfed period of said filter element, a container, conduit means connected between said vessel and said container for discharging the filtrate fluid from said vessel into said container, first outlet means from said container to connect said container to a vacuum source and second outlet means from said container to feed said filtrate fluid to said collector stage.

7. A continuously operative vacuum filter as defined in claim 2 wherein there are further included $n+2$ conduit means for discharging the respective fluid outputs from said filter elements and wherein said collector stage comprises $n+1$ pipes multifurcating from each of said last named circuit means respectively, $(n+1)$ $(n+2)$ time controlled valves, each of said valves being associated with one of said tubes, $n+1$ containers for receiving the fluid discharged through groups of corresponding ones of said tubes and said valves, the opening and closing times of said valves being time controlled whereby each of said containers always receives the same fluid from said filter elements.

8. A continuously operative vacuum filter as defined in claim 2 wherein there is further provided $n+1$ conduits for feeding said slurry and said washing fluids to said feeder-distributor stage and wherein said feeder-distributor stage comprises a container having said $n+2$ compartments, each of said conduits being opposed to and positioned to discharge into all but one of said compartments respectively, means associated with said container and operative in response to the control of said timing means for synchronously rotating said container at a rate of one rotation per said time cycle whereby each of said compartments is in opposing relationship with each of said conduits for one period during said cycle to sequentially be fed the $n$ fluids and the slurry therefrom and is unfed for one period, $n+2$ outlet means communicating with and leading from each of said compartments respectively, and $n+2$ means for feeding the fluids from said conduits to corresponding respective filter elements whereby each of said filter elements is sequentially fed said slurry and said fluids during $n+1$ periods of said cycle and remains unfed during one period of said cycle and whereby each of said slurry and fluids are sequentially fed to each of said filter elements.

9. A continuously operative vacuum filter as defined in claim 8 wherein said means for feeding said fluids from said conduits to said filter elements comprises $n+2$ concentrically planarly disposed ducts into which said outlet means respectively discharge, $n+2$ receptacles, $n+2$ pipes connecting said ducts to said receptacles respectively to discharge the contents of said ducts into said receptacles, and $n+2$ time controlled valves connected between respective receptacles and filter elements, the openings and closings of said valves being timed whereby one of said slurry and fluids is fed from a receptacle to a filter element only after the immediately preceding fed fluid has been discharge through said filter element.

10. A continuously operative vacuum filter as defined in claim 8 wherein there are further included $n+2$ conduit means for discharging the respective fluid outputs from said filter elements and wherein said collector stage comprises a vessel adapted to be rotated along a vertical axis and divided into $n+1$ compartments which are disposed to receive the fluid from said respective conduit means, each of said other compartments being disposed to receive the respective fluids from each of said other conduit means, $n+1$ tubes communicating with and leading from each of said compartments and $n+1$ containers for respectively receiving the fluid discharged through one of said tubes, means controlled by said timing means for rotating said vessel in synchronism with the rotation of the container of said feeder-distributor stage, the respective sizes of said compartments and indexing of said container for rotation being so chosen whereby the one of said compartments which comes into position opposite two of said conduit means concurrently during one of said periods receives only one of the fluids from said filter elements through one of said last named conduit means, the other of said last named conduit means being from the filter element which is unfed during said last named one period whereby each of said compartments and said containers always receives the same fluid.

11. A continuously operative vacuum filter as defined in claim 8 wherein said collector stage vessel is a toroidal duct and wherein there are further included $n+1$ concentrically horizontally planarly disposed toroidal receptacles, each of said tubes being connected betwen one of said compartments in said duct and one of said toroidal receptacles, and $n+1$ tubes connected respectively between one of said toroidal receptacles and one of said containers.

References Cited

UNITED STATES PATENTS 2,687,806  8/1954  Becker _____ 210—391 X

REUBEN FRIEDMAN, *Primary Examiner.*

F. SPEAR, *Assistant Examiner.*